No. 690,604. Patented Jan. 7, 1902.
R. B. PRICE.
RUBBER VEHICLE TIRE.
(Application filed Apr. 11, 1901.)
(No Model.)
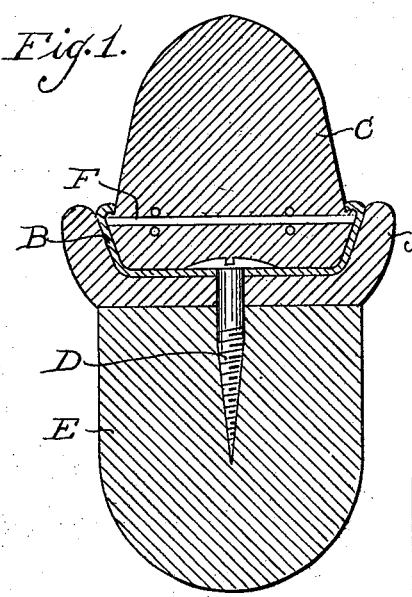
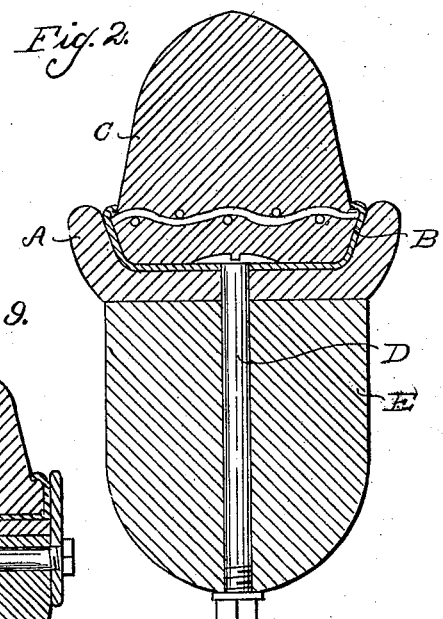
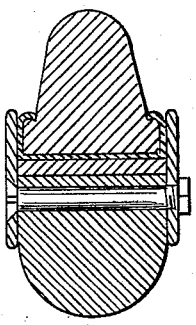
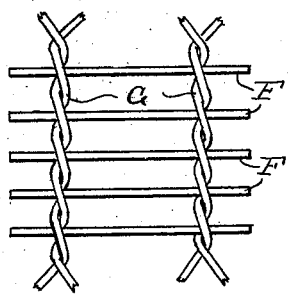
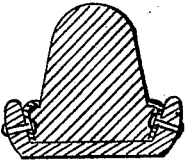
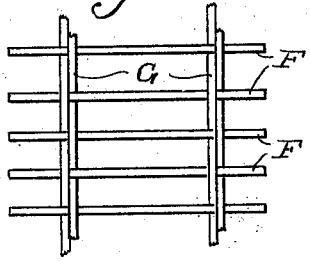
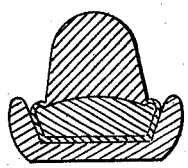
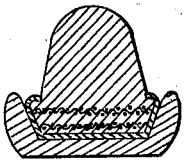
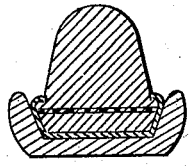
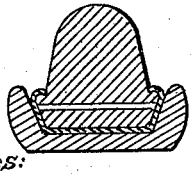
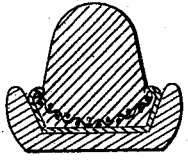
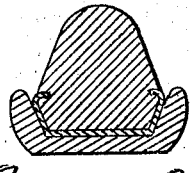
Witnesses:
E. F. Wilson
John Snowhook
Inventor:
Raymond B. Price
By Rudolph Wm Lotz
Attorney

UNITED STATES PATENT OFFICE.

RAYMOND B. PRICE, OF CHICAGO, ILLINOIS.

RUBBER VEHICLE-TIRE.

SPECIFICATION forming part of Letters Patent No. 690,604, dated January 7, 1902.

Application filed April 11, 1901. Serial No. 55,336. (No model.)

*To all whom it may concern:*

Be it known that I, RAYMOND B. PRICE, a citizen of the United States, residing at Chicago, in the county of Cook and State of Illinois, have invented certain new and useful Improvements in Rubber Vehicle-Tires; and I do hereby declare the following to be a full, clear, and exact description of the invention, such as will enable others skilled in the art to which it appertains to make and use the same.

This invention relates to a novel construction in a rubber vehicle-tire, the object being to provide a tire which can be vulcanized in great lengths and secured to the wheel in a very simple and efficient manner; and it consists in the features of construction and combinations of parts hereinafter fully described and claimed.

In the accompanying drawings, illustrating this invention, Figure 1 is a transverse section of a tire and rim constructed in accordance with my invention, showing same mounted upon the felly of a wheel. Figs. 2, 3, 4, 5, 6, 7, 8, 9, and 10 are transverse sections of modified forms of this invention. Figs. 11 and 12 are detail views showing two forms of wire-cloth stiffening-strips adapted to be intermolded in the base portion of the tire.

This invention consists, essentially, in providing within the rim A a supplementary sheet-metal rim B, preferably of a non-corrosive metal, the flanges of which project beyond the flanges of the rim A and are adapted to be bent over inwardly to engage the base portion of the tire C. The said supplementary rim B is firmly secured within the rim A in any suitable manner, but preferably by means of the screws or bolts D, securing the rim A to the felly E. The base portion of said tire C is preferably stiffened either by intermolding a suitable stiffening material, as shown in Figs. 1, 2, 4, 5, 6, and 7, or by vulcanizing said base portion to a greater degree than the tread portion, as shown in Fig. 3. For stiffening said base a wire-cloth strip is preferably used, as shown in Figs. 1 and 2, and the particular form of wire-cloth shown in Figs. 11 and 12 is most desirable, for the reason that in this form the lateral wires F are practically straight and uniformly spaced and are firmly bound together by longitudinal wires G, separated by spaces greater than those between the lateral wires. The said longitudinal wires G are either twisted about each other and about the lateral wires, as shown in Fig. 12, or run parallel and in close contact with each other, their convolutions being alternated to cause them to pass over and under each of the lateral wires. Wire-cloth of this description is advantageous, for the reason that its weight per square inch is considerably less than that of the ordinary wire-cloth and it better serves the purpose of laterally stiffening the tire, which is desired, the longitudinal wires serving only to keep the lateral wires in place. The longitudinal wires may also be secured to the lateral wires by means of electric welding, brazing, or other suitable means. The said stiffening-strips intermolded in said base portion of the tire may be multiplied to secure any desired hardness in said base.

In mounting said tire the rim A and auxiliary rim B are mounted on the felly of the wheel. The tire C is then inserted and fitted, and projecting edges of the flanges of said auxiliary rim B are then bent over to engage the tire. If it is desired to repair the tire C, said edges of the auxiliary rim can be easily bent back to release the tire.

The supplemental rim B is made from sheet metal or other material capable of being bent at its edges to secure the tire and unbent to release the same, whereby the work of applying the tire and replacing worn tires is greatly facilitated. The construction of the present wheel-rim is such as will preclude bending of the flanges without danger of fracture; but by reason of my supplemental rim the main rim is left intact, and consequently retains its strength.

The particular advantages of this method of fastening are that the tire is absolutely prevented from rolling in the rim, and thereby all cutting of the tire is prevented, that the tire can be easily removed for purposes of repair, that it cannot be torn out of the rim by any lateral or torsional strains to which it may be subjected and that it cannot travel around the rim, and that any lateral strain is distributed over the entire base, thereby decreasing its intensity.

The application of this tire is so simple that any person can do it, no special tools or machinery being required.

I claim as my invention—

1. In a vehicle-tire, the combination of a wheel rim or channel, a rubber tire, and a supplemental rim or channel secured to the wheel rim or channel and receiving the tire, the flange edges of the supplemental rim or channel being bent over to engage the tire after the insertion of the latter.

2. In a vehicle-tire, the combination of a wheel rim or channel, a rubber tire, devices intermolded in the tire and extending laterally to the surface thereof, and a supplemental rim or channel secured to the wheel rim or channel and receiving the tire, the flanged edges of the supplemental rim or channel being bent to engage the devices after the insertion of the rim.

3. In a vehicle-tire, the combination of a wheel rim or channel, a rubber tire, a plurality of parallel wires intermolded in and extending laterally to the surface of the tire, means in the tire holding the wires regularly spaced, and a supplemental rim or channel secured to the wheel rim or channel and receiving the tire, the flanged edges of the supplemental rim or channel being bent over to engage the wires after the insertion of the tire.

In testimony whereof I affix my signature in presence of two witnesses.

RAYMOND B. PRICE.

Witnesses:
RUDOLPH WM. LOTZ,
E. F. WILSON.